Sept. 16, 1952      E. H. HOLDEN      2,610,457

POTATO HARVESTER

Filed Aug. 18, 1949

INVENTOR.
E. H. Holden
BY

Patented Sept. 16, 1952

2,610,457

UNITED STATES PATENT OFFICE 2,610,457

POTATO HARVESTER

Elmer H. Holden, Poplarville, Miss.

Application August 18, 1949, Serial No. 110,993

8 Claims. (Cl. 55—139)

This invention relates to harvesting apparatus and more particularly to a device for harvesting vegetables such as potatoes which are disposed beneath the surface of the earth.

Heretofore, numerous harvesters for this purpose have been developed but the majority of these have been comparatively large and cumbersome utilizing numerous parts and subject to frequent breakdowns and comparatively expensive to maintain. Likewise, many of these prior art devices required excessive power for operation thereof with the result that the cost of harvesting per acre was unreasonably high.

It is accordingly an object of this invention to provide relatively simple and inexpensive harvesting apparatus which may be constructed of readily available material which incorporates no moving parts and yet an apparatus which will efficiently operate for the purpose intended.

Another object of the invention is to provide harvesting apparatus which may be conveniently attached to a relatively small tractor or other draft appliance and which will serve to screen the vegetables from the earth and deposit the same upon the surface thereof rearwardly of the apparatus.

A further object of the invention is to provide a harvesting device which by a simple modification requiring only the removal of a single unitary part may be adapted for use in loosening the earth around nursery stock such as shrubs or small trees without injury to the roots or body thereof and which will facilitate the transplanting of the same.

Figure 1:
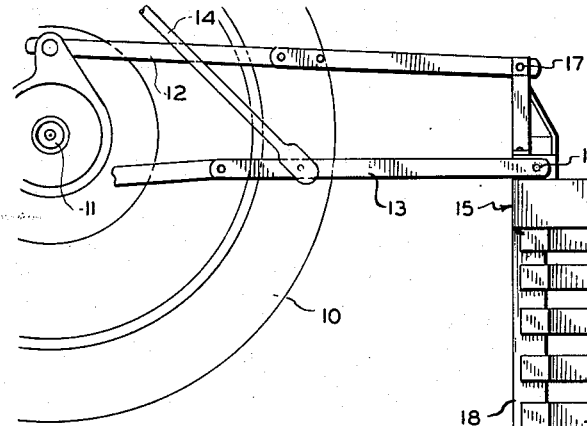
Figure 2:
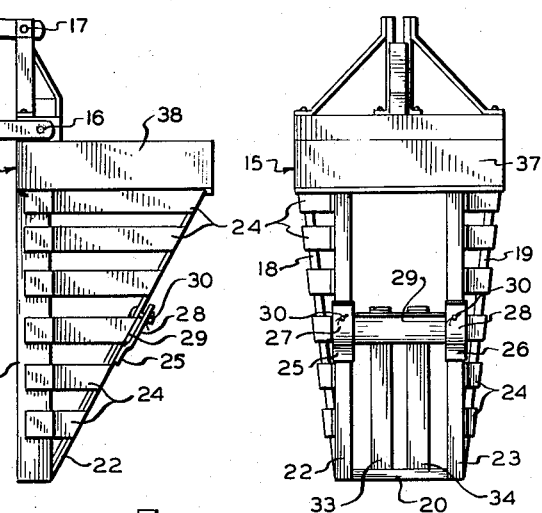
Figure 3:
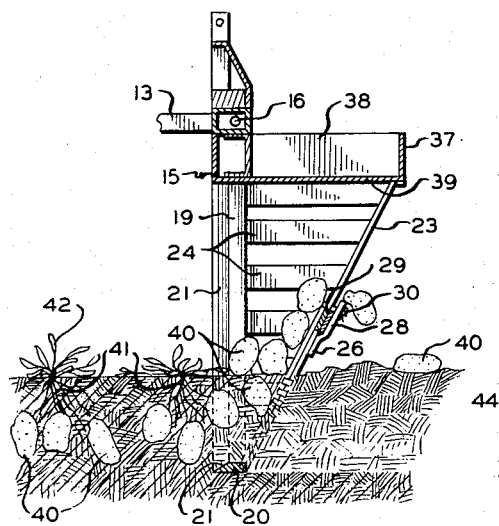
Figure 4:
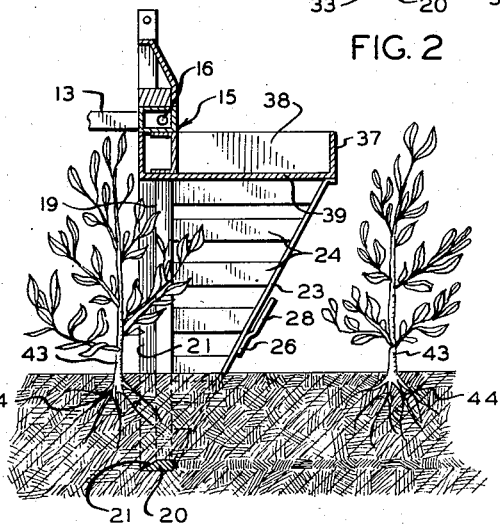
Figure 5:
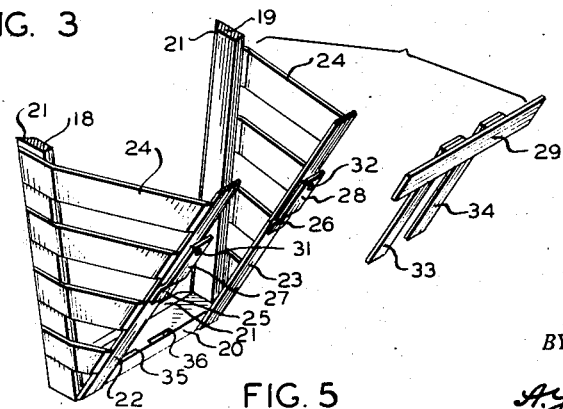

Further objects and advantages of the present invention will be apparent from the following specification taken in conjunction with the attached drawings, wherein:

Fig. 1 is a side elevation of harvesting apparatus in accordance with this invention attached to a tractor, a portion only of the tractor being shown in this view;

Fig. 2, a rear elevation of the device;

Fig. 3, a view similar to Fig. 1 with parts removed and parts shown in section of the device in operation and showing the manner in which vegetables are separated from the earth and deposited on the surface thereof;

Fig. 4, a view similar to Fig. 3, but showing the device in use for facilitating the transplanting of small shrubs or trees; and, Fig. 5, a fragmentary exploded perspective view showing the way in which the device is modified for use in facilitating the transplanting of trees.

With continued reference to the drawings there is shown in Fig. 1 the drive wheels 10 of a tractor or other draft appliance, wheels 10 being rotatably mounted on an axle 11 to which is secured draft bars 12 and 13. Draft bars 13 are pivotally mounted on the tractor and are adjustable vertically by rods or links 14 secured thereto and to a power operated adjusting mechanism not shown. The conventional tractor is provided with portions of draft bars 12 and 13 and the conventional power operated links 14 which are secured to the structure.

The harvesting apparatus comprises a substantially scoop-like structure having a main frame 15 generally rectangular in configuration, this frame being provided with pivot pins 16 and 17 for attachment to the draft bars 12 and 13. Secured to the frame 15 and extending downwardly therefrom are side bars 18 and 19, these side bars being connected at their lower ends by a cross bar 20. The forward edges of side bars 18 and 19 and cross bar 20 are beveled as at 21 to provide cutting edges.

Cross bar 20 is also connected to the frame 15 by inclined spaced brace bars 22 and 23 secured at their lower ends to the cross bar 20 and at their upper ends to the frame 15 adjacent the rear edge thereof. Bars 22 and 23 are connected to side bars 18 and 19 by substantially horizontally disposed spaced bars 24, these bars converging inwardly from the side bars 18 and 19 to cooperate in forming a scoop-like structure.

Substantially midway of the length of bars 22 and 23 there are provided brackets 25 and 26 which are secured to the bars 22 and 23 by welding or the like and which have portions 27 and 28 spaced from the bars 22 and 23. These brackets serve to receive and support a cross member 29 which may be removably disposed between portions 27 and 28 and the bars 22 and 23 and held in position by pins 30 extending through apertures in bars 22 and 23 and apertures 31 and 32 in the brackets 25 and 26. Secured to cross member 29 and extending at substantially right angles thereto are spaced members 33 and 34 which, when cross member 29 is in position in the brackets 25 and 26, are received in slots 35 and 36 in the cross bar 20. The space between cross member 29 and the lower surface of frame 15 is open in order to permit objects such as potatoes or other vegetables to be harvested to pass freely therethrough.

The frame 15 may be provided with side walls 37 and 38 to form a box-like structure having a bottom 39 within which may be deposited stones, sandbags, or any other desired weight in order to properly ballast the device and cause sufficient penetration of the earth and to prevent undesired upward movement.

As shown in Fig. 3, potatoes or other vegetables 40 are deposited beneath the surface of the earth attached to the roots 41. Prior to harvesting the plants 42 are substantially dead and the vegetable 40 is only loosely attached to the roots and is therefore easily separated therefrom. In operation the apparatus is positioned with the cross bar 20 disposed beneath the surface of the earth at a depth somewhat below the depth of the vegetable in the ground. Movement of the device in a forward direction by operation of the tractor or other draft device results in the cutting edges provided by the beveled portions 21 on the side bars 18 and 19 and the cross bar 20 severing the earth around the vegetables and thus causing the vegetables to come in contact with the horizontally disposed bars 24 and the spaced rearwardly inclined bars 22 and 23 and the spaced members 33 and 34. The earth is substantially pulverized by contact with these members and passes through the spaces therebetween while the vegetables 40 are screened therefrom and move upwardly and rearwardly over the cross member 29 to be deposited on the surface of the earth to the rear of the device. The vegetables may then be picked up and bagged or otherwise disposed of in any desired manner.

In order to utilize the device for facilitating the transplanting of small trees 43 such as are commonly found in nurseries, it is only necessary to remove the pins 30 and cross member 29 together with spaced inclined members 33 and 34, thus providing an unobstructed rectangular opening in the rear of the device through which the trees 43 may pass. As shown in Fig. 4 the apparatus is positioned with the cross bar 20 disposed in the earth below the normal depth of the roots 44 of the tree 43, the cutting edges formed by the beveled portions 21 serving to sever the earth on three sides of the tree roots without damaging the same. The trunk of the tree passes through the rectangular opening in the rear of the device after which it is only necessary to operate the apparatus at right angles to the first path of operation in order to sever the earth on all sides of the tree. After completion of this operation the tree, together with a mass of earth surrounding the roots, may be bodily lifted out of the ground and wrapped in burlap or other desired material for transportation or transplanting thereof.

It will be seen that by the above invention there has been provided a relatively simple, economically constructed device which will efficiently operate both as a vegetable harvester and by a simple alteration to facilitate the transplanting of small trees or shrubs, the device requiring no moving parts and consequently very little upkeep and being capable of withstanding any of the ordinary shocks encountered in uses of this kind. With the structure employed, should large obstacles appear in the path of movement thereof, the device may be conveniently lifted by operation of rods 14 attached to the power operated mechanism within the tractor, the device being returned to original position after clearing the obstacle.

It will be obvious to those skilled in the art that various changes may be in the invention without departing from the spirit and scope thereof and therefore the invention is not limited by that which is shown in the drawings and described in the specification but only as indicated in the appended claims.

What is claimed is:

1. Harvesting apparatus comprising a frame, draft means for moving said frame with relation to the earth, side bars secured to said frame and extending downwardly to the earth, a cross bar connecting the lower ends of said side bars, the forward edges of said side bars and said cross bar being beveled to provide cutting edges, rearwardly inclined spaced bars connecting said cross bar and said frame, a plurality of spaced substantially horizontally disposed bars connecting said side bars and said inclined bars, a cross member removably secured to said inclined bars substantially midway between said frame and said cross bar, spaced members secured to said cross member and removably secured to said cross bar whereby said cross bar and a portion of said side bars may be disposed below the surface of the earth and upon movement therethrough the earth will be pulverized and pass between said horizontally disposed bars and said spaced members, and relatively large obstacles disposed in the earth in the path of movement of said apparatus will be screened therefrom to be discharged rearwardly through the space above said cross member and weight receiving means provided on said frame whereby said apparatus may be weighted sufficiently to prevent undesirable upward movement thereof.

2. Harvesting apparatus comprising a frame, draft means for moving said frame with relation to the earth, side bars secured to said frame and extending downwardly, a cross bar connecting the lower ends of said side bars, the forward edges of said side bars and said cross bar being beveled to provide cutting edges, rearwardly inclined spaced bars connecting said cross bar and said frame, a plurality of spaced substantially horizontally disposed bars connecting said side bars and said inclined bars, a cross member removably secured to said inclined bars substantially midway between said frame and said cross bar, spaced members secured to said cross member and removably secured to said cross bar whereby said cross bar and a portion of said side bars may be disposed below the surface of the earth and upon movement therethrough the earth will be pulverized and pass between said horizontally disposed bars and said spaced members and relatively large obstacles disposed in the earth in the path of movement of said apparatus will be screened therefrom and be discharged rearwardly through the space above said cross member, and weight receiving means provided on said frame whereby said apparatus may be weighted to prevent undesired upward movement thereof.

3. Harvesting apparatus comprising a frame, draft means for moving said frame with relation to the earth, side bars secured to said frame and extending downwardly, a cross bar connecting the lower ends of said side bars the forward edges of said side bars and said cross bar being beveled to provide cutting edges, rearwardly inclined spaced bars connecting said cross bar and said frame, a plurality of spaced substantially horizontally disposed bars connecting said side bars and said inclined bars, a cross member secured to said inclined bars susbtantially midway between said frame and said cross bar, spaced members secured to said cross member and secured to said cross bar whereby said cross bar and a portion of said side bars may be disposed below the surface of the earth and upon movement therethrough the earth will be pulverized and pass between said horizontally disposed bars and said spaced members and relatively large obstacles disposed in the earth in the path of movement of said apparatus will be screened therefrom and be discharged rearwardly through the space above said cross member, and weight receiving means provided on said frame whereby said apparatus may be weighted sufficiently to prevent undesirable upward movement thereof.

4. Harvesting apparatus comprising a frame, draft means for moving said frame with relation to the earth, side bars secured to said frame and extending downwardly, a cross bar connecting the lower ends of said side bars, the forward edges of said side bars and said cross bar being beveled to provide cutting edges, rearwardly inclined spaced bars connecting said cross bar and said frame, a plurality of spaced substantially horizontally disposed bars connecting said side bars and said inclined bars, a cross member secured to said inclined bars substantially midway between said frame and said cross bar, spaced members secured to said cross member and secured to said cross bar whereby said cross bar and a portion of said side bars may be disposed below the surface of the earth and upon movement therethrough the earth will be pulverized and pass between said horizontally disposed bars and said spaced members and relatively large obstacles disposed in the earth in the path of movement of said apparatus will be screened therefrom and be discharged rearwardly through the space above said cross member.

5. Harvesting apparatus as defined in claim 1 in which said horizontally disposed bars converge inwardly from said side bars to form a scoop-like structure.

6. Harvesting apparatus comprising a frame, draft means for moving said frame with relation to the earth, said frame including a rearwardly extending portion, side bars secured to said frame and extending downwardly, a cross bar connecting the lower ends of said side bars, the forward edges of said side bars and said cross bar being beveled to provide cutting edges, rearwardly inclined spaced bars connecting said cross bar and said rearwardly extending portion of said frame, a plurality of spaced substantially horizontally disposed bars connecting said side bars and said inclined bars whereby said cross bar and a portion of said side bars may be disposed below the surface of earth and upon movement therethrough the earth will pass between said inclined bars and be severed on three sides of obstacles disposed in the path of movement of said apparatus, said obstacles also passing between said inclined bars.

7. A harvester comprising a draft frame, a pair of side bars arranged in spaced side by side relation extending downwardly and secured at their upper ends to said frame, a cross bar secured at its ends to the lower ends of said side bars, a pair of spaced brace bars arranged in spaced relation and extending from said frame downwardly and forwardly to said side bars, the upper ends of said brace bars secured to said frame rearwardly of said side bars and the lower ends of said brace bars secured to the lower ends of said side bars, horizontally disposed spaced bars extending from the side bars and converging inwardly to the corresponding brace bars, a cross member removably secured to said brace bars intermediate the upper and lower ends thereof and spaced inclined members secured at one end to said cross member and removably supported at the other end in said cross bar.

8. Harvesting apparatus comprising a frame, draft means for moving said frame with relation to the earth, said frame including a rearwardly extending portion, side bars secured to said frame and converging in a downward direction, a cross bar connecting the lower ends of said side bars, the forward edges of said side bars and said cross bar being beveled to provide cutting edges, rearwardly inclined substantially parallel spaced bars connecting said cross bar and said frame rearwardly of said beveled edges, a plurality of spaced substantially horizontally disposed bars connecting said side bars and said inclined bars whereby said cross bar and a portion of said side bars may be disposed below the surface of earth and upon movement therethrough the earth will pass between said inclined bars and be severed on three sides of obstacles disposed in the path of movement of said apparatus, said obstacles also passing between said inclined bars.

ELMER H. HOLDEN.

REFERENCES CITED

The following references are of record in the file of this patent:

UNITED STATES PATENTS

| Number | Name | Date |
| --- | --- | --- |
| 1,010,555 | Whittington | Dec. 5, 1911 |
| 1,106,668 | Moore | Aug. 11, 1914 |
| 1,131,850 | Mayhall | Mar. 16, 1915 |
| 1,184,605 | Adams et al. | May 23, 1916 |
| 1,239,354 | Cordrey | Sept. 4, 1917 |
| 1,269,550 | Beasley | June 11, 1918 |

FOREIGN PATENTS

| Number | Country | Date |
| --- | --- | --- |
| 8,868 | Austria | Aug. 25, 1902 |